US008147151B2

(12) United States Patent  
Chou

(10) Patent No.: US 8,147,151 B2  
(45) Date of Patent: Apr. 3, 2012

(54) SHUTTER DEVICE

(75) Inventor: Tai-Hsu Chou, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/873,276

(22) Filed: Aug. 31, 2010

(65) Prior Publication Data

US 2011/0228373 A1    Sep. 22, 2011

(30) Foreign Application Priority Data

Mar. 17, 2010 (TW) ................ 99107703 A

(51) Int. Cl.
*G03B 9/10* (2006.01)
(52) U.S. Cl. ...................................... 396/493
(58) Field of Classification Search .............. 396/466, 396/493
See application file for complete search history.

(56) References Cited

U.S. PATENT DOCUMENTS

| 4,334,749 A * | 6/1982 | Saito et al. ............. 396/469 |
| 4,751,543 A * | 6/1988 | Kodaira et al. ........ 396/235 |
| 5,706,120 A * | 1/1998 | O'Brien et al. ........ 359/230 |
| 2007/0159030 A1 * | 7/2007 | Naganuma et al. ..... 310/49 R |

* cited by examiner

*Primary Examiner* — W. B. Perkey
*Assistant Examiner* — Fang-Chi Chang
(74) *Attorney, Agent, or Firm* — Altis Law Group, Inc.

(57) ABSTRACT

The shutter device includes a base, a post, a coil, a shutter, a first magnetic member, and a second magnetic member. The base defines a first aperture. The post is fixedly mounted on the base. The coil is connected to the post and rotatable around the post. The shutter blade is coupled to the post and jointly rotatable with the coil. The first and second magnetic members are mounted on the base arranged on two sides of the coil. The first and second magnetic members are configured for driving the coil to rotate, thereby moving the shutter blade to selectively expose or cover the first aperture.

18 Claims, 5 Drawing Sheets

SHUTTER DEVICE

BACKGROUND

1. Technical Field

The present disclosure relates to imaging technologies, particularly, to a shutter device.

2. Description of Related Art

Shutter devices are widely used in image capturing devices, such as cameras or mobile phones having an image capturing function, to allow light to pass through for a determined duration, for the purpose of exposing photographic film or an image sensor to light, thereby capturing an image of a scene.

Generally, the shutter device includes a motor, such as a step motor, and a shutter blade. The motor drives the shutter blade to move to make the shutter device open or close. However, the step motor occupies too much space, thus adding substantially to the size of the shutter device.

Therefore, it is desirable to provide a shutter device, which can overcome or at least alleviate the above-mentioned problems.

BRIEF DESCRIPTION OF THE DRAWINGS

Many aspects of the present shutter device can be better understood with reference to the following drawings. The components in the drawings are not necessarily drawn to scale, the emphasis instead being placed upon clearly illustrating the principles of the present shutter device. Moreover, in the drawings, like reference numerals designate corresponding parts throughout the several views.

DETAILED DESCRIPTION

Figure 1:
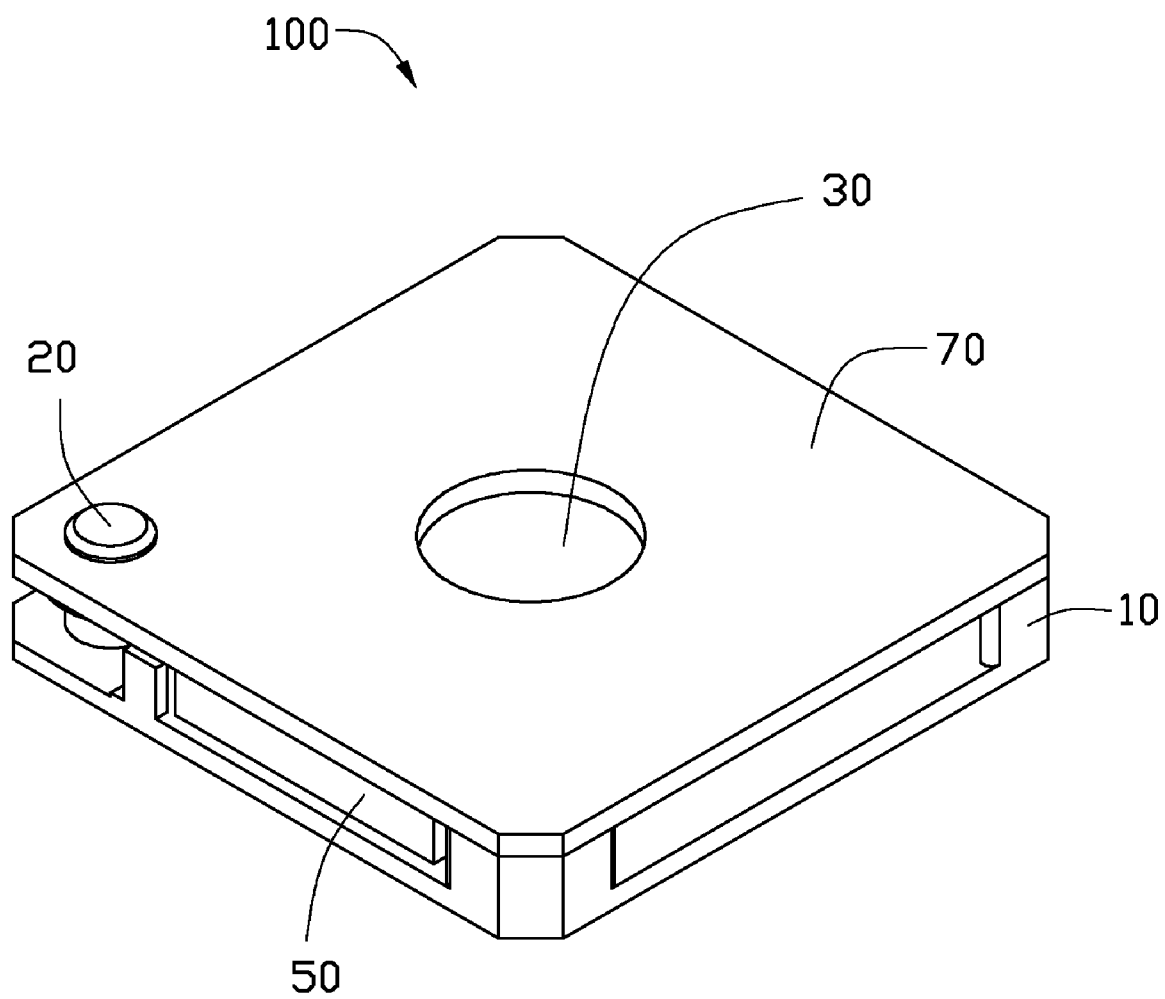
FIG. 1 is a schematic, isometric view of a shutter device, according to an exemplary embodiment.
Figure 2:
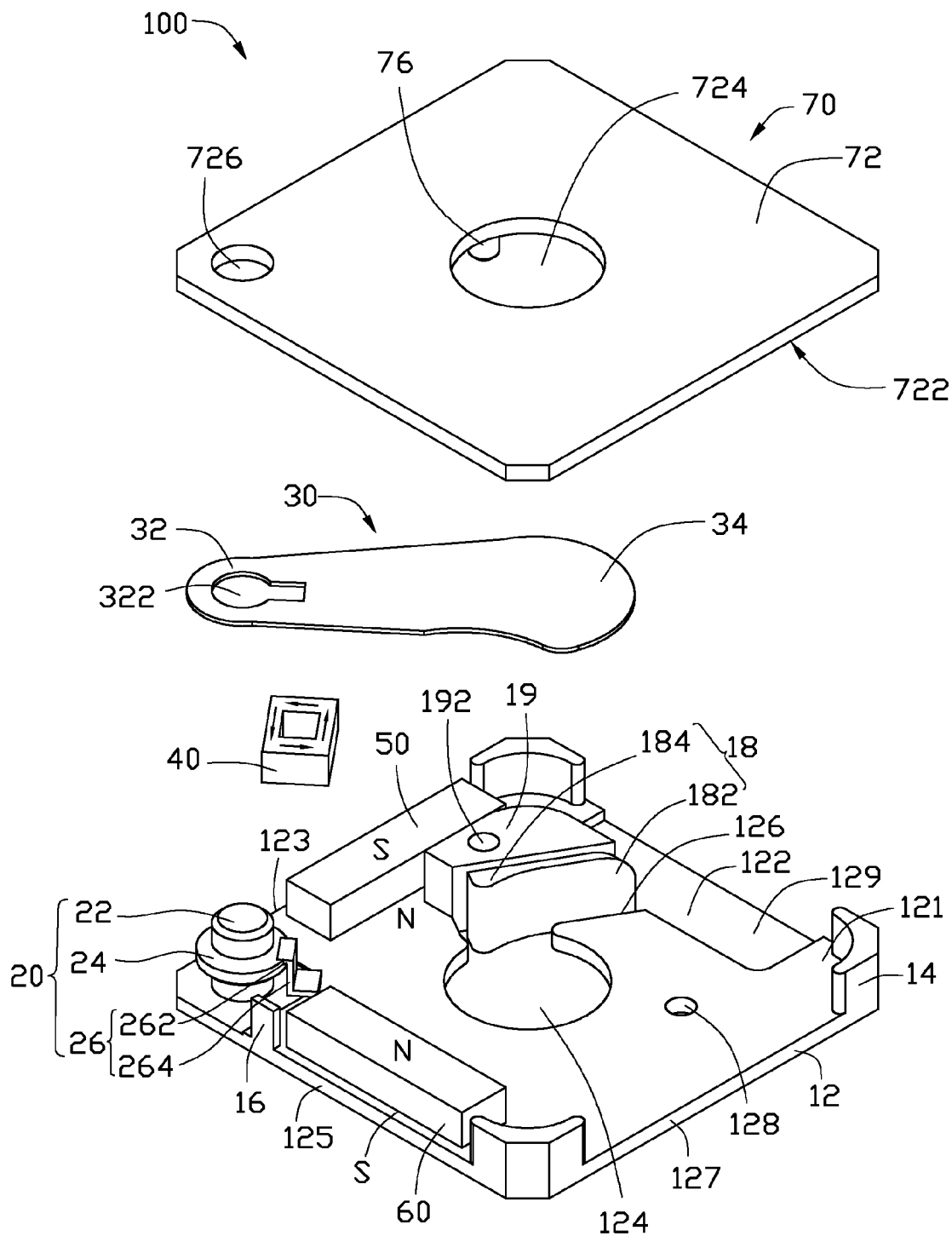
FIG. 2 is a partially exploded view of the shutter device of FIG. 1.
Figure 3:
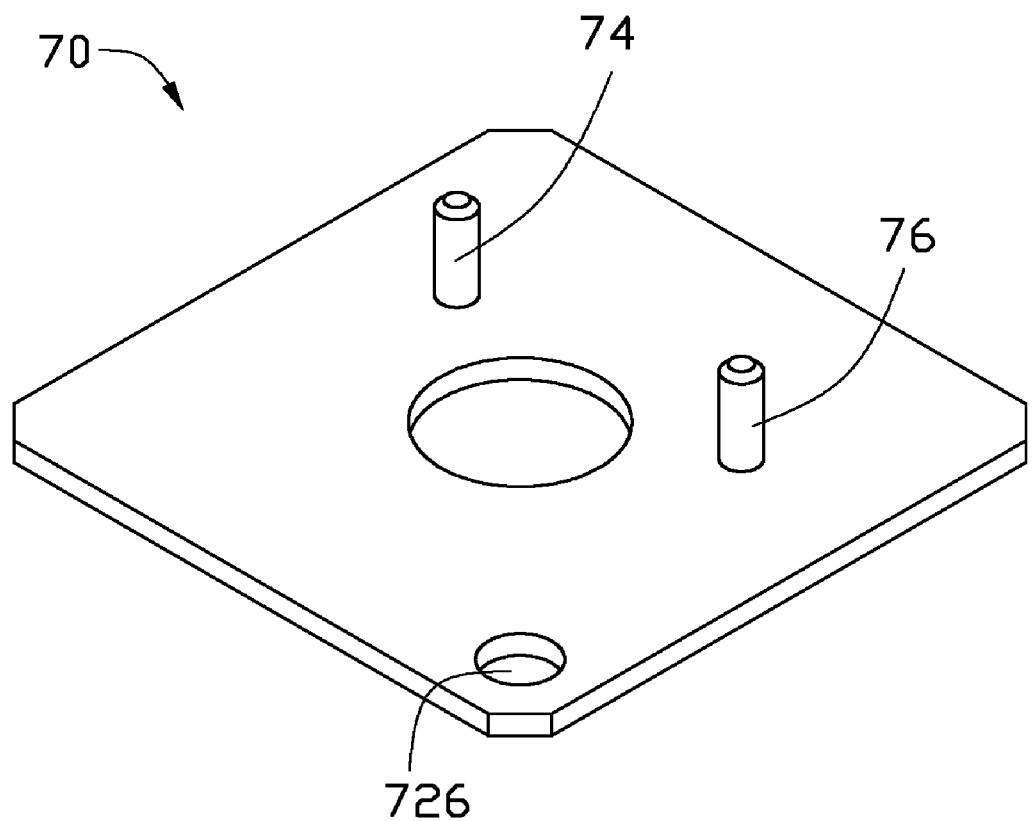
FIG. 3 is a schematic, isometric view of a cover of the shutter device of FIG. 2, but viewed from another aspect.

Referring to FIGS. 1-3, a shutter device 100, according to an exemplary embodiment, includes a support 10, a rotating member 20, a shutter blade 30, a coil 40, a first magnetic member 50, a second magnetic member 60, and a cover 70. The cover 70 covers the support 10. The rotating member 20, the shutter blade 30, the coil 40, the first magnetic member 50, and the second magnetic member 60 are positioned between the support 10 and the cover 70.

The support 10 includes a base 12, three protrusions 14, a blocking portion 16, a buffer 18, and an engaging portion 19.

The base 12 is substantially square-shaped. The base 12 includes a supporting surface 120, a first side 121, a second side 123, a third side 125 parallel to the first side 121, and a fourth side 127 parallel to the second side 123. The base 12 defines a recess 122, a first aperture 124, a slot 126, and a first engaging hole 128. The recess 122 is located adjacent to the first side 121. A bottom surface 129 in the recess 122 is recessed relative to the supporting surface 120. The first aperture 124 is defined in a center of the base 12. The slot 126 is defined between the recess 122 and the first aperture 124. The slot 126 communicates with the recess 122 and the first aperture 124. The first engaging hole 128 is positioned adjacent to the first aperture 124.

The three protrusions 14 respectively extend from the supporting surface 120 at three of four corners of the base 12.

The blocking portion 16 extends from the supporting surface 120 on the third side 125 of the base 12.

The buffer 18 is comprised of an elastic material and includes a first end 182 and a second end 184. The first end 182 and the second end 184 are at opposite sides of the buffer 18. The first end 182 is fixed on the bottom surface 129, and the second end 184 is suspended in the slot 126.

The engaging portion 19 extends from the supporting surface 120 adjacent to the slot 126. A second engaging hole 192 is defined in the engaging portion 19.

The rotating member 20 is positioned at the remaining corner of the base 12. The rotating member 20 includes a post 22, a ring-shaped pad 24, and a Z-shaped tab 26. The post 22 is fixed on the supporting surface 120. The pad 24 is rotatably mounted on the post 22. The tab 26 is fixedly connected to the pad 24 and spaced apart from the supporting surface 120. That is, the tab 26 does not contact the supporting surface 120. The tab 26 includes a connecting portion 262 and a supporting portion 264. The connecting portion 262 and the supporting portion 264 cooperatively form a Z-shape. The connecting portion 262 is fixed to the pad 24. The connecting portion 262 hangs the supporting portion 264 from the pad 24. The supporting portion 264 is spaced from the supporting surface 120.

The shutter blade 30 includes a connecting end 32 and a free end 34. The connecting end 32 and the free end 34 are at opposite sides of the shutter blade 30. A through hole 322 is defined in the connecting end 32. The post 22 and the connecting portion 262 extend through the through hole 322. The connecting end 32 is bonded to the pad 24 by adhesive. The area of the free end 34 is greater than that of the first aperture 124.

The coil 40 is mounted on the supporting portion 264. The direction and intensity of electric current of the coil 40 is controlled by a driving circuit (not shown) electrically connected to the coil 40. In other embodiments, the coil 40 may be mounted on the shutter blade 30.

The first magnetic member 50 is mounted on the second side 123. The first magnetic member 50 is a permanent magnet. A magnetic field generated by the first magnetic member 50 has a North (N)-to-South (S) direction perpendicular to the supporting surface 120. In this embodiment, the N pole faces the supporting surface 120, and the S pole faces away from the supporting surface 120.

The second magnetic member 60 is mounted on the third side 125 between the blocking portion 16 and a protrusion 14. The second magnetic member 60 is also a permanent magnet. A magnetic field generated by the second magnetic member 60 has a N-to-S direction perpendicular to the supporting surface 120. In this embodiment, the S pole faces the supporting surface 120, and the N pole faces away from the supporting surface 120.

Referring to FIG. 3 together with FIG. 2, the cover 70 includes a plate 72, a first engaging post 74, and a second engaging post 76. The plate 72 includes a plane surface 722 opposite to the supporting surface 120. The plate 72 defines a second aperture 724 aligned with the first aperture 124 and a positioning hole 726 corresponding to the post 22. The first engaging post 74 extends from the plane surface 722 corresponding to the first engaging hole 128. The second engaging post 76 extends from the plane surface 722 corresponding to the second engaging hole 192.

When the cover 70 is mounted on the support 10, the post 22 passes through the positioning hole 726. The first engaging post 74 engages with the first engaging hole 128. The second engaging post 76 engages with the second engaging hole 192. The plane surface 722 is supported by the three protrusions 14.

Figure 4:
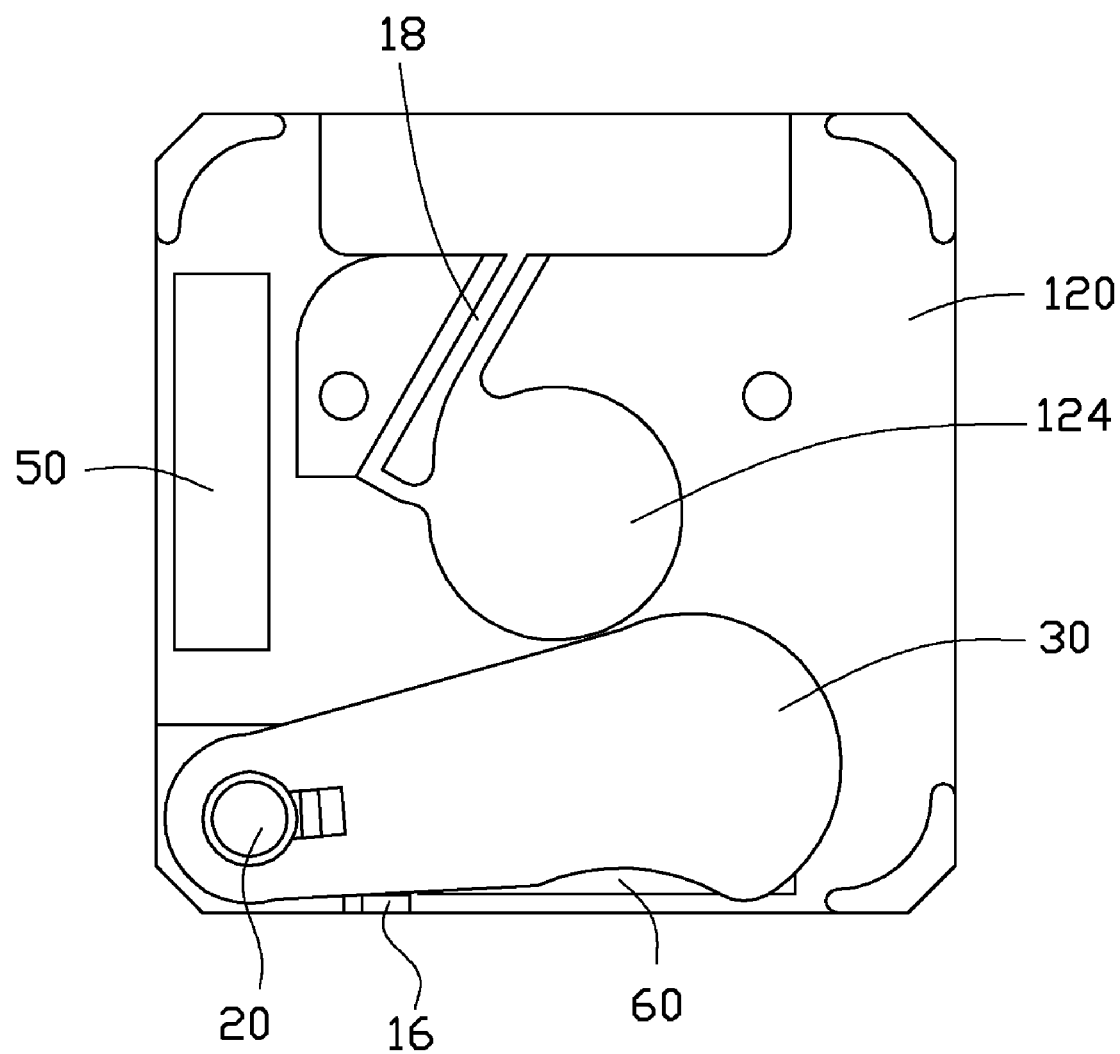
FIG. 4 is a planar view of the shutter device of FIG. 1, showing the shutter device in an open state.
Figure 5:
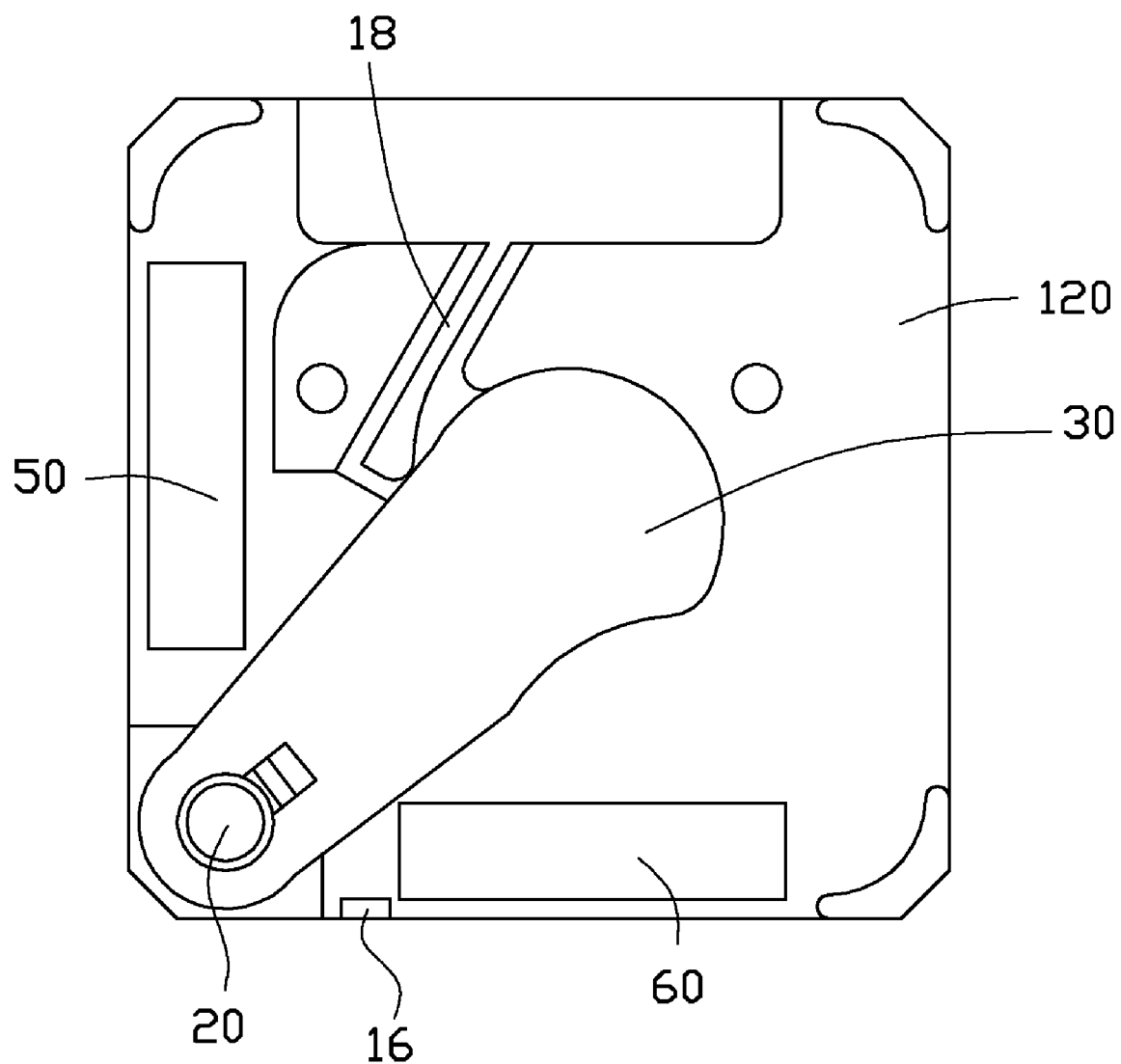
FIG. 5 is similar to FIG. 4, but showing the shutter device in a closed state.

Referring to FIGS. 2 and 4-5, the shutter blade 30 opens the first aperture 124 in a natural state. When the shutter device 100 is activated, an electric current is applied to the coil 40. Direction of the electric current of the coil 40 is counterclockwise, as indicated by an arrow in FIG. 2, when the shutter device 100 is viewed from above. The first and second magnetic members 50, 60 produce magnetic fields. According to Ampere's rule, the coil 40 suffers an Ampere's force pointing from the second magnetic member 60 to the first magnetic member 50. The coil 40 is pulled from the second magnetic member 60 to the first magnetic member 50. The pad 24, the tab 26, and the shutter blade 30 rotate about the post 22 counterclockwise under the Ampere's force until the buffer 18 blocks the shutter blade 30. Therefore, the shutter blade 30 covers the first aperture 124 in a closed state.

At a next time, when an exposing state is needed, direction of the electric current of the coil 40 is clockwise (not shown). According to the same principle as detailed above, the coil 40 is pulled from the first magnetic member 50 to the second magnetic member 60. The pad 24, the tab 26, and the shutter blade 30 rotate about the post 22 clockwise under the Ampere's force until the blocking portion 16 blocks the shutter blade 30. Therefore, the shutter blade 30 exposes the first aperture 124. The shutter device 100 is in an open state.

With the above configuration, the shutter device 100 avoids using step motors, and the shutter blade 30 can be moved by the cooperation of the coil 40, the first magnetic member 50, and the second magnetic member 60. Accordingly, the size of the shutter device 100 substantially decreases. In addition, the buffer 18 and the blocking portion 16 block the shutter blade 30 avoid over movement and excessive vibration of the shutter blade 30 and reduce shutter activation noise.

It is to be understood, however, that even though numerous characteristics and advantages of the present embodiments have been set forth in the foregoing description, together with details of the structures and functions of the embodiments, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A shutter device, comprising:
   a support comprising a base, three protrusions, and a buffer, the base being substantially square-shaped and comprising a supporting surface, a first side, a second side, a third side parallel to the first side, and a fourth side parallel to the second side, the base defining a first aperture therein, a recess adjacent to the first side, and a slot communicating the recess and the first aperture, the protrusions extending from the supporting surface and positioned at three corners of the base, the buffer fixed on a bottom surface in the recess and suspended in the slot;
   a rotating member positioned at the remaining corner of the base and comprising a post fixedly mounted on the base;
   a coil connected to the post and rotatable around the post;
   a shutter blade coupled to the post and jointly rotatable with the coil; and
   a first magnetic member and a second magnetic member mounted on the base and arranged on two sides of the coil, the first and second magnetic members configured for driving the coil to rotate, thereby moving the shutter blade to selectively expose or cover the first aperture.

2. The shutter device as claimed in claim 1, wherein the support further comprises a blocking portion, the first magnetic member is mounted on the second side, the second magnetic member is mounted on the third side, and the blocking portion extends from the supporting surface and is located adjacent to the second magnetic member.

3. The shutter device as claimed in claim 2, wherein the buffer is comprised of an elastic material and includes a first end and a second end opposite to the first end, the first end is fixed on the bottom surface, and the second end is suspended in the slot.

4. The shutter device as claimed in claim 3, wherein the rotating member further comprises a ring-shaped pad and a Z-shaped tab, the pad is rotatably mounted on the post, the tab is fixedly connected to the pad and spaced apart from the supporting surface, and the coil is mounted on the tab.

5. The shutter device as claimed in claim 4, wherein the tab comprises a connecting portion and a supporting portion, the connecting portion and the supporting portion cooperatively form a Z-shape, the connecting portion is fixed to the pad, the supporting portion is hanged on the pad through the connecting portion, and the supporting portion is spaced from the supporting surface.

6. The shutter device as claimed in claim 5, wherein the shutter blade comprises a connecting end and a free end opposite to the connecting end, a through hole is defined in the connecting end, the post and the connecting portion extend through the through hole, and the connecting end is attached to the pad.

7. The shutter device as claimed in claim 6, wherein the area of the free end is greater than that of the first aperture.

8. The shutter device as claimed in claim 7, further comprising a cover defining a second aperture and a positioning hole, the second aperture aligned with the first aperture, wherein the cover comprises a plate, a first engaging post, and a second engaging post, the first engaging post and the second engaging post extend from the plate toward the support, the base defines a first engaging hole, the support further comprises an engaging portion mounted on the supporting surface, the engaging portion defines a second engaging hole, the first engaging post engages in the first engaging hole, the second engaging post engages in the second engaging hole, the post of the rotating member extends through the positioning hole, and the plate is supported by the protrusions.

9. The shutter device as claimed in claim 8, wherein the first magnetic member and the second magnetic member are permanent magnets.

10. The shutter device as claimed in claim 8, wherein the north magnetic pole of the first magnetic member faces the supporting surface, the south magnetic pole of the first magnetic member faces away from the supporting surface, the south magnetic pole of the second magnetic member faces the supporting surface, and the north magnetic pole of the second magnetic member faces away from the supporting surface.

11. A shutter device comprising: a support comprising a base, three protrusions, and a buffer, the base being substantially square-shaped and comprising a supporting surface, a first side, a second side, a third side parallel to the first side, and a fourth side parallel to the second side, the base defining a first through hole, a recess adjacent to the first side, and a slot communicating the recess and the first through hole, the protrusions extending from the supporting surface and positioned at three corners of the base, the buffer fixed on a bottom surface in the recess and suspended in the slot; a cover defining a second through hole aligned with the first through hole, the first and second through holes cooperatively defining a light passage; a rotating member positioned at the remaining corner of the base and comprising a post arranged between the base and the cover; a shutter blade rotatably coupled to the post; a coil fixedly coupled to the shutter blade; a first permanent magnet and a second permanent magnet mounted on the base and arranged on two sides of the coil, the first and second permanent magnets configured for applying a combined magnetic force to the coil to drive the coil to rotate, thereby moving the shutter blade to selectively close or open the light passage; and a driving circuit configured for controlling directions and intensity of the electric current flowing in the coil.

12. The shutter device of claim 11, wherein the post is perpendicular to the base.

13. A shutter device comprising:
a base defining a first through hole;
a cover defining a second through hole aligned with the first through hole, the first and second through holes cooperatively defining a light passage;
a post arranged between the base and the cover;
a shutter blade rotatably coupled to the post;
a coil fixedly coupled to the shutter blade;
a first permanent magnet and a second permanent magnet mounted on the base and arranged on two sides of the coil, a lengthwise direction of the first permanent magnet being perpendicular to a lengthwise direction of the second permanent magnet, the first magnetic member having a north magnetic pole facing the base, the second magnetic member having a south magnetic pole facing the base, the first and second permanent magnets configured for applying a combined magnetic force to the coil to drive the coil to rotate, thereby moving the shutter blade to selectively close or open the light passage; and
a driving circuit configured for controlling directions and intensity of the electric current flowing in the coil.

14. The shutter device as claimed in claim 13, further comprising a support and a rotating member, wherein the rotating member comprises the post, the support comprises three protrusions and the base, the base is substantially square-shaped and comprises a supporting surface, the protrusions extend from the supporting surface and are positioned at three corners of the base, and the rotating member is positioned at the remaining corner of the base.

15. The shutter device as claimed in claim 14, wherein the support further comprises a buffer, the base comprises a first side, a second side, a third side parallel to the first side, and a fourth side parallel to the second side, the base defines a recess adjacent to the first side, and a slot communicating the recess and the first through hole, and the buffer is fixed on a bottom surface in the recess and suspended in the slot.

16. The shutter device as claimed in claim 15, wherein the support further comprises a blocking portion, the first magnetic member is mounted on the second side, the second magnetic member is mounted on the third side, and the blocking portion extends from the supporting surface and is located adjacent to the second magnetic member.

17. The shutter device as claimed in claim 16, wherein the buffer is comprised of an elastic material and includes a first end and a second end opposite to the first end, the first end is fixed on the bottom surface, and the second end is suspended in the slot.

18. The shutter device as claimed in claim 17, wherein the cover comprises a plate, a positioning hole defined in the plate, a first engaging post, and a second engaging post, the first engaging post and the second engaging post extend from the plate toward the support, the base defines a first engaging hole, the support further comprises an engaging portion mounted on the supporting surface, the engaging portion defines a second engaging hole, the first engaging post engages in the first engaging hole, the second engaging post engages in the second engaging hole, the post of the rotating member extends through the positioning hole, and the plate is supported by the protrusions.

* * * * *